2,985,612
Patented May 23, 1961

2,985,612
ALKYL PHENACETONYL PHTHALATES AND VINYL CHLORIDE POLYMER COMPOSITIONS PLASTICIZED THEREWITH

Robert H. Mills, Webster Groves, Mo., assignor to Monsanto Chemical Company, St. Louis, Mo., a corporation of Delaware No Drawing. Filed Sept. 15, 1958, Ser. No. 760,836

10 Claims. (Cl. 260—31.8)

This invention relates to new and useful compounds, specifically alkyl phenacetonyl phthalates and certain mono-and di-halo ring substituted derivatives thereof.

In accordance with this invention it has been found that phenacetonyl phthalates of the structure

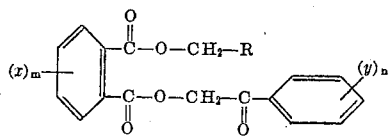

where R is a straight or branched chain alkyl radical containing from one to twelve carbon atoms, x and y are selected from the group consisting of chlorine and bromine, and m and n are integers of from 0 to 2. As illustrative of R are methyl, ethyl, propyl, isopropyl, butyl, isobutyl, amyl, 2-methyl-1-pentyl, and dodecyl radicals. It is preferred that R be an alkyl radical containing 3 to 7 carbon atoms.

The compounds of this invention may be readily and conveniently prepared by preparing the alkyl acid phthalate, e.g. by reacting the appropriate alcohol with phthalic anhydride, converting this to the alkali metal salt form and then reacting the alkali metal salt of the half ester with an alpha-haloacetophenone.

Either phthalic anhydride or phthalic acid may be used as a starting material; however, the anhydride is especially preferred. When the chlorophthalates are desired, the mono- and dichlorophthalic anhydrides are the preferred starting materials, e.g. 3-chlorophthalic anhydride, 4-chlorophthalic anhydride, 3,4-dichlorophthalic anhydride, 4,5-dichlorophthalic anhydride, etc.

Of the alpha-haloacetophenones, alpha-chloroacetophenone is preferred. The bromo- and chlorophenacetonyl phthalates are desirably obtained by using an alpha-chloroacetophenone in which the bromine or chlorine has been introduced into the ring prior to the esterification reaction, e.g. α-chloro-4-chloroacetophenone, α-chloro-3-chloroacetophenone, α-chloro-3,4-dibromoacetophenone, etc.

As exemplary of the alcohols which may be used in preparing the compounds of this invention there may be mentioned: methyl alcohol, ethyl alcohol, n-propyl alcohol, isopropyl alcohol, n-butyl alcohol, isobutyl alcohol, isoamyl alcohol, n-heptyl alcohol, 2-ethylhexyl alcohol, n-nonyl alcohol, lauryl alcohol, etc. The so called "oxo" alcohols containing from seven to twelve carbon atoms may also be used to prepare the compounds of this invention.

These new compounds are useful as plasticizers for vinyl chloride containing resins which include polyvinyl chloride and copolymers of vinyl chloride with other unsaturated materials copolymerizable therewith such as vinyl acetate; diethyl maleate; vinylidene chloride, vinyl propionate, vinyl butyrate, vinyl benzoate; methyl acrylate; ethyl acrylate; propyl acrylate; butyl acrylate; allyl acrylate; methyl methacrylate; ethyl methacrylate; propyl methacrylate; styrene; o-chlorostyrene; p-chlorostyrene; 2,5-dichlorostyrene; p-ethylstyrene; divinyl benzene; vinyl naphthalene; α-methylstyrene; butadiene; chloroprene; acrylic acid amide; acrylic acid anilide; acrylic acid nitrile; and esters of α,β-unsaturated carboxylic acids such as the methyl, ethyl, propyl, butyl, amyl, hexyl, heptyl, octyl, allyl, methallyl and phenyl esters of maleic, crotonic, itaconic and fumaric acids. Such resins when plasticized with the new compounds of this invention (e.g. in amounts of 30 to 100 parts per 100 parts resin) have been found to be highly satisfactory in instances wherein the so plasticized resin is used under conditions wherein it contacts oily materials such as gasoline, kerosene, lubricating oils, greases or liquid and semi-solid hydrocarbons derived from the destructive distillation of coal, food oils and semi-solid oily materials such as butter, margarine, corn oil, cottonseed oil, and the like.

It is well known that dioctylphthalate plasticized vinyl chloride containing resins in the form of films, sheets, molded products, etc., upon contact with oily materials such as the aforedescribed, the dioctylphthalate is extracted or migrates from the polymer composition to the oily material, and this causes the film, sheet, molded product to become brittle. The employment of the new compounds of this invention for plasticizing vinyl chloride containing resins provides a plasticized vinyl chloride polymer having improved resistance to deterioration by such liquid or semi-solid oily materials. These new plasticizers when incorporated in such resins are additionally characterized by very low volatility properties.

As illustrative of the preparation of the alkyl phenacetonyl phthalates of this invention is the following; in which the parts are parts by weight unless otherwise noted:

Example I

In a suitable reaction vessel is added 99 parts of phthalic anhydride and 168 parts of n-butyl alcohol. The mix is refluxed and while refluxing 35.8 parts of sodium carbonate is added. The mixture is refluxed for about 30 minutes while removing butyl alcohol and the water by-product. Thereupon and while refluxing approximately 1.5 parts of triethylamine and 98.5 parts of α-chloroacetophenone is added. The system is then refluxed for about 120 minutes while removing the residual butyl alcohol and by-products. The reaction mass is cooled and washed with aqueous sodium carbonate, and then steam distilled to remove impurities. The residue is washed successively with aqueous sodium carbonate and water, and then dried under vacuum. Upon filtering 196.6 parts of oily butyl phenacetonyl phthalate $$(n_D{}^{27}=1.5476)$$

is obtained.

Example II

Replacing n-butyl alcohol of Example I with an equimolecular weight of isoamyl alcohol, there is obtained isoamyl phenacetonyl phthalate.

Example III

Replacing n-butyl alcohol of Example I with an equimolecular weight of 2-ethylhexanol there is obtained 2-ethylhexyl phenacetonyl phthalate.

Example IV

Replacing n-butyl alcohol of Example I with an equimolecular weight of n-dodecyl alcohol there is obtained n-dodecyl phenacetonyl phthalate.

Example V

Into a suitable reaction vessel there is added 37.1 parts of phthalic anhydride and 57.6 parts of butanol. The mixture is refluxed for 15 minutes, cooled to 90°–110° C. and 13.5 parts of sodium carbonate are added.

The mixture is refluxed for about 30 minutes while removing butyl alcohol and the water by-product. Thereafter 0.5 part of triethylamine and 60.8 parts of alpha-bromo-p-chloroacetophenone are added and the system is refluxed for about two hours while removing the residual butyl alcohol and by-products. The reaction mass is cooled and washed with aqueous sodium carbonate. After three additional water washes the ester is dried at 100° C. for 30 minutes. The low boiling components are removed by heating the dried ester to 210° C. at 0.6 mm. Hg absolute pressure. An essentially quantitative yield of a product identified as butyl p-chlorophenacetonyl phthalate ($n_D^{25}=1.5596$) is obtained.

*Example VI*

Replacing the phthalic anhydride and the α-bromo-p-chloroacetophenone of Example V with equimolecular amounts of monochloro-phthalic anhydride (equal parts of 3-chloro and 4-chloro) and α-chloroacetophenone respectively, a good yield of butyl phenacetonyl monochlorophthalate ($n_D^{25}=1.5591$) is obtained.

*Example VII*

Replacing the phthalic anhydride and the α-bromo-p-chloroacetophenone of Example V with equimolecular amounts of 3,4-dichlorophthalic anhydride and α-chloroacetophenone respectively, a good yield of butyl phenacetonyl 3,4-dichlorophthalate is obtained.

*Example VIII*

Replacing the phthalic anhydride of Example V with an equimolecular amount of 3-chlorophthalic anhydride, an excellent yield of butyl p-chlorophenacetonyl 3-chlorophthalate is obtained.

*Example IX*

Replacing the α-bromo-p-chloroacetophenone of Example V with an equimolecular amount of α-chloro-p-bromo acetophenone, a good yield of butyl p-bromophenacetonyl phthalate is obtained.

In order to illustrate the unique properties of the new esters of this invention, compositions comprising

| | A | B | C | D | E |
|---|---|---|---|---|---|
| Polyvinyl chloride | 100 | 100 | 100 | 100 | 100 |
| Di-2-ethylhexyl phthalate | 67 | | | | |
| Butyl benzyl phthalate | | 67 | | | |
| Butyl phenacetonyl phthalate | | | 67 | | |
| Butyl-p-chlorophenacetonyl phthalate | | | | 67 | |
| Butyl phenacetonyl monochloro phthalate | | | | | 67 | are prepared by mixing polyvinyl chloride with the respective plasticizers in amounts set forth above on differential speed rolls at a roll temperature of 160° C. to form a homogeneous composition which is removed from the roll in the form of crude sheets. From the crude sheets are molded finished sheets employing a suitable mold at 2000 p.s.i. at 325° F. for about 5 minutes. A weighed portion of each sheet so obtained is immersed for 24 hours in kerosene at 70° F. Thereupon each sheet is removed, wiped free of kerosene and dried at 80° C. for 24 hours. The dried sheets are weighed and the weight percent of plasticizer extracted noted below:

Composition: Weight percent extracted
A _____ 32.0
B _____ 3.6
C _____ 0.8
D _____ 0.9
E _____ 0.8

Similar results are obtained when the following novel alkyl phenacetonyl phthalates are substituted for the alkyl phenacetonyl phthalates in the foregoing compositions:

Propyl phenacetonyl phthalate
Isopropyl 4-chlorophenacetonyl phthalate
$C_8$-oxo-phenacetonyl phthalate
2-ethylhexyl phenacetonyl monochlorophthalate
Butyl phenacetonyl 4,5-dichlorophthalate
Butyl phenacetonyl 3,4-dibromophthalate
Butyl 3-chlorophenacetonyl 4-bromophthalate
Isoamyl phenacetonyl phthalate
Isobutyl phenacetonyl phthalate
n-Heptyl phenacetonyl phthalate
Sec.-amyl phenacetonyl phthalate
Capryl phenacetonyl phthalate While this invention is described with respect to certain embodiments it is not so limited and it is to be understood that variations and modifications thereof may be made which are obvious to those skilled in the art without departing from the spirit or scope of this invention.

This application is a continuation-in-part of application Serial Number 554,405, filed December 21, 1955, and now abandoned.

What is claimed is:

1. Alkyl phenacetonyl phthalate of the structure

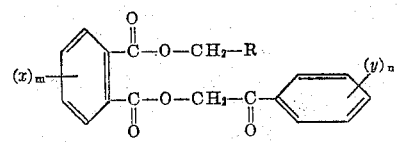

where R is an alkyl radical containing from one to twelve carbon atoms, x and y are selected from the group consisting of chlorine and bromine, and m and n are integers of from 0 to 2.

2. Alkyl phenacetonyl phthalates of the structure

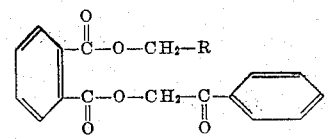

where R is an alkyl radical containing 3 to 7 carbon atoms.

3. Butyl phenacetonyl phthalate.
4. Butyl p-chlorophenacetonyl phthalate.
5. Butyl phenacetonyl monochlorophthalate.
6. A composition of matter which comprises a vinyl chloride polymer selected from the group consisting of polyvinyl chloride and copolymers of vinyl chloride with other ethylenically unsaturated monomers and a plasticizing amount of an alkyl phenacetonyl phthalate of the structure

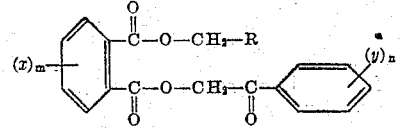

where R is an alkyl radical containing from one to twelve carbon atoms, x and y are selected from the group consisting of chlorine and bromine, and m and n are integers of from 0 to 2.

7. A composition of matter which comprises polyvinyl chloride and a plasticizing amount of an alkyl phenacetonyl phthalate of the structure

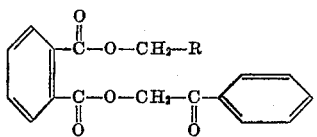

where R is an alkyl radical containing 3 to 7 carbon atoms.

8. The composition of claim 7 in which the alkyl phenacetonyl phthalate is butyl phenacetonyl phthalate.

9. The composition of claim 6 in which the alkyl phenacetonyl phthalate is butyl p-chlorophenacetonyl phthalate.

10. The composition of claim 6 in which the alkyl phenacetonyl phthalate is butyl phenacetonyl monochlorophthalate.

No references cited.